United States Patent [19]

Takano et al.

[11] Patent Number: 4,926,269
[45] Date of Patent: May 15, 1990

[54] METHOD OF READING AND DISPLAYING AN IMAGE IN AN INFORMATION FILING APPARATUS

[75] Inventors: Sakuharu Takano; Toshiki Nishibori, both of Nara; Yuji Katsuta, Yamatokoriyama, all of Japan

[73] Assignee: Sharp Kabushiki Kaisha, Osaka, Japan

[21] Appl. No.: 264,827

[22] Filed: Oct. 31, 1988

[30] Foreign Application Priority Data

Oct. 31, 1987 [JP] Japan ............................ 62-276574

[51] Int. Cl.⁵ .................................................. H04N 1/04
[52] U.S. Cl. .............................. 358/474; 382/45; 340/724
[58] Field of Search ............... 358/256, 257, 280, 283, 358/285, 264, 404; 340/724, 726; 382/45

[56] References Cited

U.S. PATENT DOCUMENTS

| | | | |
|---|---|---|---|
| 4,602,251 | 7/1986 | Sawada et al. | 340/724 |
| 4,694,406 | 9/1987 | Shibui et al. | 340/726 |
| 4,734,689 | 3/1988 | Kurakake | 340/724 |
| 4,760,458 | 7/1988 | Watabe et al. | 358/256 |
| 4,769,852 | 9/1988 | Hashimoto et al. | 340/724 |
| 4,803,478 | 2/1989 | Olsen | 340/724 |
| 4,827,347 | 5/1989 | Bell | 358/909 |

FOREIGN PATENT DOCUMENTS

0123360 7/1984 Japan .

*Primary Examiner*—Howard W. Britton
*Assistant Examiner*—Kim Yen Vu

[57] ABSTRACT

In an information filing apparatus, a portion of an image read by a scanner is immediately displayed on a display screen, even though the display screen is smaller than the entire image to be read. When the display image corresponding to the image portion which has just been read by the scanner reaches a predetermined location of the display screen, the display image is scrolled in synchronism with an image reading operation of the scanner. The image portion which has just been read by the scanner is then displayed on the predetermined location of the display screen.

2 Claims, 3 Drawing Sheets

METHOD OF READING AND DISPLAYING AN IMAGE IN AN INFORMATION FILING APPARATUS

BACKGROUND OF THE INVENTION

1. Field of the Invention

The present invention relates to a method for reading and displaying an image in an information filing apparatus in which the image read by a scanner and is immediately displayed on a screen.

2. Description of the Prior Art

In a conventional method for reading and displaying an image in an information filing apparatus, the image to be read is initially plane-scanned by a scanner in a direction that is shown by an arrow in FIG. 2 (hereinafter referred to as the subscanning direction). Analog data of this image that is read by the scanner are stored in a memory after being converted to digital data, and simultaneously, the stored image data are read out and displayed on a display screen in real time.

More specifically, as the subscanning is carried out by the scanner successively from the position (a) towards the position (i) in FIG. 2, the display of the image is shown in FIG. 4a. Letters (a) through (i) indicated below respective the display images represent scanner positions that are shown in FIG. 2.

As shown in FIGS. 2 and 4a, when the display screen is smaller than the image to be read, the image is similarly displayed in a reduced size on the screen until the scanner reaches the position (e). However, when the screen fully displays a portion of image as shown by the image (e) in FIG. 4a, the display image no longer varies even though the scanner travels from the position (f) to (i). As a result, the screen continues to display the image (e) in FIG. 4a along with a comment which indicates that the image is still being read.

Such a comment informs an operator that the operation for reading the image is being executed. The operator, however, cannot determine whether or not the image to be read is correctly being read and stored. Accordingly, in the above described conventional method, portions of the image read by the scanner cannot be immediately displayed on the display screen. Furthermore, when the operator wishes to confirm how the image was read, he must scroll, in a troublesome manner, the display image, as shown in FIG. 4b, on the basis of the image data stored in the memory after the reading operation has been completed.

SUMMARY OF THE INVENTION

Accordingly, the present invention has been developed with a view to substantially eliminate the above described disadvantage inherent in the prior art image reading and displaying method for an information filing apparatus, and for its essential object to provides an improved method which enables the image read by a scanner to be immediately displayed on a display screen, even though the display screen is smaller than the image to be read.

In the information filing apparatus employing therein the image reading and displaying method of the present invention, when the display screen fully displays a portion of the display image, an operator can confirm how the image is being read by scrolling the display image in synchronism with the image reading operation.

In accomplishing this and other objects, an image reading and displaying method of the present invention is characterized by the steps of:

(a) beginning to scroll a display image when the display screen is smaller than the image to be read and the display image corresponding to the image which has just been read by the scanner reaches a predetermined location on the display screen;

(b) scrolling the display image in synchronism with an image reading operation of the scanner; and (c) displaying the image which has just been read by the scanner on the predetermined location of the display screen.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Figure 1:
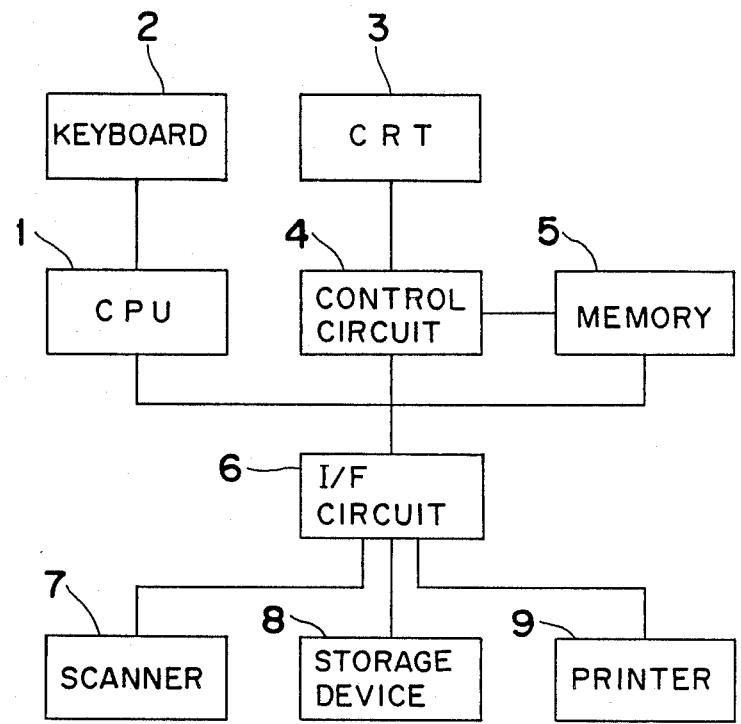
FIG. 1 is a block diagram of an information filing apparatus according to an embodiment of the present invention.

FIG. 1 depicts a block diagram of an information filing apparatus according to one preferred embodiment of the present invention.

Reference numeral 1 represents a CPU for controlling the entire information filing apparatus to execute the register and retrieval processing or the like. Reference numeral 2 represents a keyboard for manually inputting retrieval conditions to be set at the time of retrieving primary information which has been registered or secondary information to be added when the primary information is registered. Reference numeral 3 represents a CRT (Cathode Ray Tube) for displaying the primary information that is read by a scanner 7, contents that are inputted by the keyboard 2 and other various information that is extracted through the retrieval processing. Reference numeral 4 represents a control circuit for controlling the CRT 3, and a memory 5 which temporarily stores therein the information to be displayed on the CRT 3, or the like. Reference numeral 8 represents a storage device having areas. For example, the areas may include a register portion for registering therein the primary information and a storage portion for storing therein the retrieval conditions. Reference numeral 9 represents a printer for outputting the primary information extracted through the retrieval processing. The scanner 7, the storage device 8 and the printer 9 are connected with the CPU 1, the control circuit 4 and the memory 5 through an interface circuit 6.

In the information filing apparatus, when an image which is registered as the primary information in the register portion of the storage device 8 is read by the scanner 7, an operator can confirm the reading condition of the image in parallel with the reading operation. To this end, an analogue image data read by the scanner 7 are converted into digital data and stored in the memory 5, the image data stored in the memory 5 are read out and displayed on the CRT 3. It is then determined on the basis of the display image that is displayed on the CRT 3 whether or not the reading condition of the image is normal. When it has been determined that the reading condition of the image is normal, the secondary information is inputted, for example, by the keyboard 2. This secondary information is then added to an appropriate location of the primary information of the image data stored in the memory 5. The primary information to which the secondary information has been added is registered in the register portion of the storage device 8.

Figure 2:
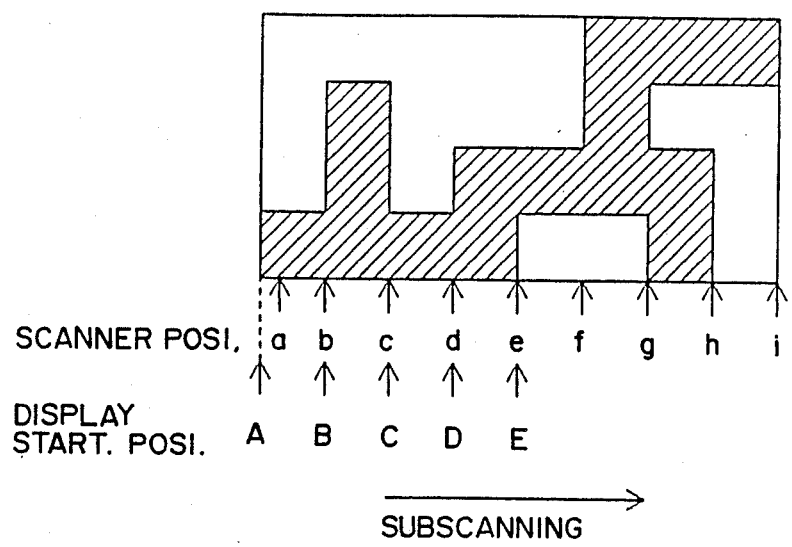
FIG. 2 is a view showing one example of an image to be read.

FIG. 2 depicts one example of the image to be read. Letters (a) through (i) appended below this figure indicate scanner positions at the time of subscanning. The subscanning is executed by the scanner 7 in a direction from (a) towards (i), as shown by the arrow in FIG. 2. Letters (A) through (E) appended below the letters (a) through (e) indicate display starting positions for starting the display of the image on the CRT 3.

Figure 3:
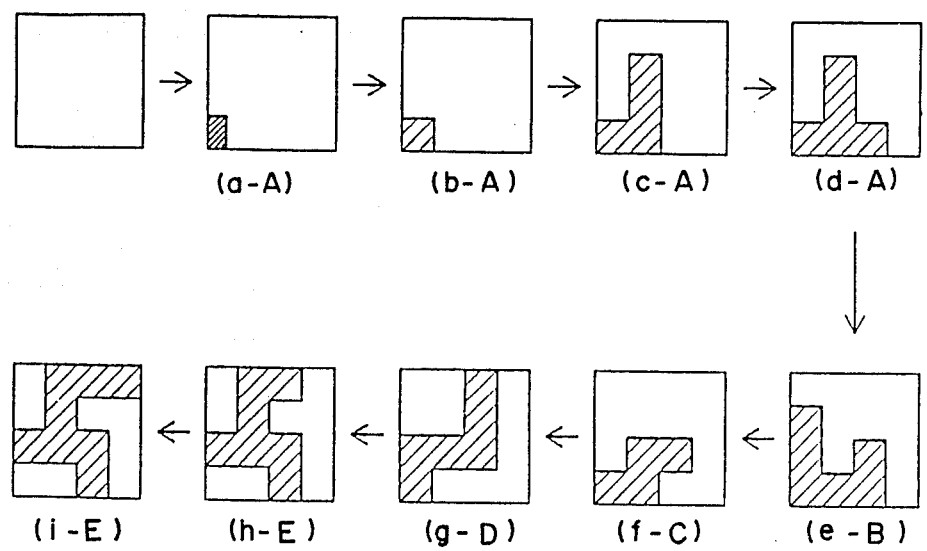
FIG. 3 is a view showing a series of display images obtained, according to an image reading and displaying method of the embodiment of the present invention, with respect to the image of FIG. 2.
Figure 4A:
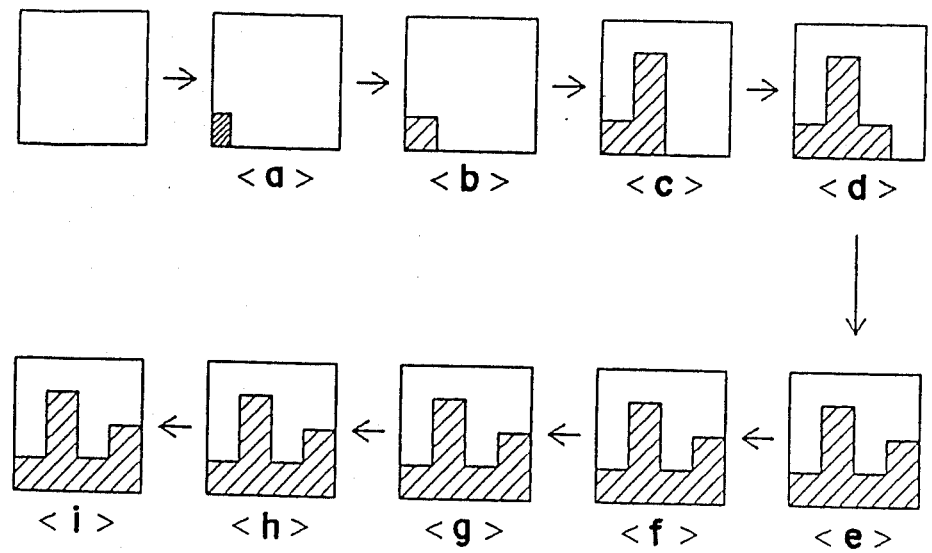
FIG. 4a is a view similar to FIG. 3, which particularly shows a series of display images according to a conventional method.
Figure 4B:
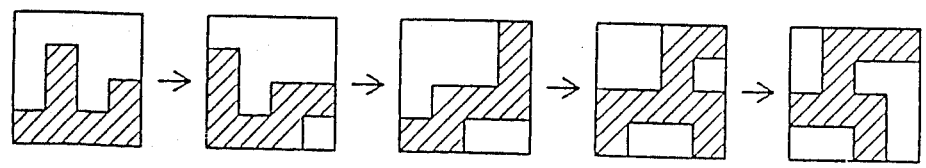
FIG. 4b is a view showing a series of display images obtained, according to the conventional method, by scrolling the display image after the reading operation has been completed.

FIG. 3 depicts a series of display images which are displayed on the CRT 3 when the image of FIG. 2 is read by the scanner 7.

With reference to FIGS. 2 and 3, the method of the present embodiment for reading and displaying an image will be explained in detail hereinafter on the assumption that the display screen of the CRT 3 is smaller than the image to be read. In the present example, the CRT 3 is assumed to can only display half of the length of the image to be read in the subscanning direction.

In FIG. 2, when the scanner 7 has started the scanning and has reached the position (a), the image data which have already been read i.e., the image data from the left end of the image of FIG. 2 to the position (a) are stored in the memory 5. At the same time, the image data are read out of the CRT 3 by one display unit from an address of the memory 5 corresponding to the display starting position (A) of the image to be read (i.e., the left end of FIG. 2) so that the image data may be displayed on the CRT 3, as shown by (a-A) in FIG. 3.

When the scanner 7 further travels and reaches the position (b), the image data from the left end of the display to the position (b), which have already been read by the scanner 7, are stored in the memory 5. Simultaneously, the image data are read out of the CRT 3 by one display unit from the address of the memory 5 corresponding to the display starting position (A) of the image to be read so that the image data may be displayed on the CRT 3, as shown by (b-A) in FIG. 3. Likewise, as the scanner 7 travels to the position (c) and to the position (d), the image gradually extends rightward and is displayed on the CRT 3, as shown by (c-A) and (d-A) in FIG. 3. The display starting position during the initial travelling is kept at position (A).

When the display image corresponding to the image which has just been read by the scanner 7 reaches a predetermined location of the display screen of the CRT 3, the scrolling of the display image is commenced. In this embodiment, the aforementioned predetermined location is away from the left end of the screen by three quarters of the horizontal length of the screen, as shown by (d-A) in FIG. 3. More specifically, when the scanner further travels as far as, for example, the position (e), the display starting position of the display screen is shifted to the position (B). Then, the image data for one display unit of the CRT 3 are read out of an address of the memory 5 corresponding to the display starting position (B) so that the image data may be displayed on the CRT 3, as shown by (e-B) in FIG. 3.

As the scanner 7 travels, the display starting position (i.e., the readout address of the image data of the memory 5) shifts to the right by the amount of travel of the scanner 7. Accordingly, when the scanner positions are (f), (g) and (h), the display starting positions are (C), (D) and (E), respectively. As a result, the image is scrolled and displayed on the CRT 3, as shown by (f-C), (g-D) and (h-E) in FIG. 3. In this way, the display image corresponding to the image which has just been read by the scanner 7 (the end of the display image) is always displayed on the predetermined location of the CRT 3 so that the reading condition of the image read by the scanner 7 may be confirmed by the display image.

When the scanner 7 reaches the position (h) and the remaining image to be read is reduced to a quarter of the display screen of the CRT 3, the display starting position is no longer shifted but is fixed to the position (E). As a result, the display image of the CRT 3 is shown by (i-E) in FIG. 3. In other words, the image located at the position (i) which has just been read by the scanner 7 is displayed at the rightmost end of the display screen of the CRT 3.

To execute the image display as described above, the image scrolling rate Vs should be determined as follows:

$$Vs = x/(t3 - 4t2).$$

Hereupon, t1: the period of time from the starting order for the scrolling up to the beginning for the readout of the image data;

t2: the period of time from the beginning of the readout for the image data up to the time that the image data corresponding to a quarter of the display screen is read out;

t3: the period for time from the beginning for the readout of the image data up to the time that the readout of the entire image data is completed; and x: the total amount of scrolling for the display image.

The scrolling of the display image is initiated after the period of time $(t1 + t2)$ has elapsed from the starting order of the scrolling and the scrolling is executed for the period of time $(t3 - 4t2)$.

From the foregoing, according to the method of the present embodiment, the image read by the scanner 7 is immediately displayed on the display screen of the CRT 3, even though the display screen is smaller than the image to be read. In this method, upon commencement of the scanning by the scanner 7, the scrolling of the display image is initiated at the time when the end of the display image has reached the predetermined location of the display screen three quarters away from the left side of the display screen. The display image is then scrolled in synchronism with the movement of the scanner 7 which is reading the image. Consequently, the image which has just been read by the scanner 7 is displayed on the predetermined location of the display screen at all times so that the operator can confirm the reading condition of the image in parallel with the reading operation.

It is to be noted here that in this embodiment, although the image, which has just been read by the scanner 7, is displayed on a location three quarters away from the left end of the display screen of the CRT 3, the image may be displayed on another location by changing the scrolling rate Vs.

As is clear from the above, in the method of the present invention, the operator can readily determine in real time whether or not the image to be read is correctly read and stored. Accordingly, it is not necessary for the operator to confirm how the image was read by scrolling the display image after the image reading operation has been completed.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method for scanning and displaying a plurality of image portions representative of an image in an information filing apparatus on display means capable of displaying a portion of the image, said method comprising the steps of:

(a) sequentially scanning a predetermined number of the plurality of image portions, said predetermined number of image portions corresponding to an image display in a predetermined area of the display means;
  (b) displaying said predetermined number of image portions on said predetermined area of the display means in response to sequentially scanning each of said predetermined number of image portions;
  (c) scanning a subsequent image portion in the plurality of image portions;
  (d) sequentially scrolling said image portions being displayed on the display means in response to and synchronized with step (c) said predetermined number of image portions including said subsequent image portion, but without a precedentially scanned image portion of said predetermined number of image portion for providing a scrolled image;
  (e) displaying said scrolled image on the display means in synchronization with step (d);
  (f) repeating steps (c)-(e) for the remainder of the plurality of image portions; and
  (g) displaying a last image portion for the plurality of image portions in a remaining area of said predetermined area on the display means.

2. The method according to claim 1, wherein said step of sequentially scrolling said predetermined number of image portions being displayed is initiated only after said predetermined number of image portions are displayed on the display means.

* * * * *